Patented May 2, 1933

1,906,784

UNITED STATES PATENT OFFICE

JOHN C. ADEN, OF MINONK, ILLINOIS, ASSIGNOR OF ONE-SIXTH TO WILEY E. PHILLIPS, ONE-SIXTH TO ARTHUR G. FITZGERALD, AND ONE-THIRD TO ARTHUR C. FORT, ALL OF MINONK, ILLINOIS

STORAGE BATTERY SOLUTION

No Drawing.   Application filed August 27, 1929. Serial No. 388,858.

My invention relates generally to storage battery electrolytes, and particularly to a solution to be added to a conventional sulphuric acid storage battery electrolyte for a lead-acid storage battery.

An important object of my invention is to provide an electrolyte of the type described, the use of which will enable better charging of storage batteries in shorter elapsed time, whether the charging be done with a battery charger or with the generator of the machine in which the battery is used.

Another important object of my invention is to provide a solution for addition to a conventional lead-acid storage battery electrolyte, the use of which eliminates the danger of damaging such a storage battery, which is usually consequent upon excessive charging thereof, whether the charging be done with a storage battery charger or with the generator of the machine on which the battery is in use.

Another important object of my invention is to provide a solution for addition to an ordinary lead-acid storage battery sulphuric acid electrolyte, the use of which, in a charging operation, will restore or rejuvenate storage batteries which have deteriorated in use or in storage. It is not claimed that batteries so deteriorated, can be restored or rejuvenated by use of the solution in the electrolyte thereof, without charging the batteries.

Other objects of the invention are to provide a storage battery electrolyte of the type described, by the addition thereto of the solution mentioned, in a manner to be hereinafter set forth, which will prolong the activity and useful life of batteries in which the same is used, which will condition the battery to more quickly respond to all demands made upon the same, and produce a quicker spark in an ignition system energized thereby, and which will enable charging a battery in an elapsed time of from five to ten hours without damage to the battery, which will preserve the battery plates and prevent them from overheating and buckling, which will remove all sulphation from the plates and prevent sulphation of new plates, and which will not deteriorate or readily evaporate whether the battery be in active service or in storage, and which is non-explosive.

In one embodiment of my invention, a dilute aqueous solution of acetic acid is mixed with a solution of uric acid in which is dissolved epsom salts and bicarbonate of soda. In another embodiment of the invention the epsom salts and bicarbonate of soda are not used in the uric acid solution.

Suggested proportions for the mixture of the ingredients mentioned are as follows:—

Solution No. 1

94 parts of distilled water.
6 parts of acetic acid.

Solution No. 2

150 parts of distilled water.
1 part of uric acid.
2 parts of epsom salts.
1 part of bicarbonate of soda.

For Solution No. 2 may be substituted the following solution:—

Solution No. 2a 150 parts of distilled water.
1 part of uric crystals.

The acetic acid in the solution assists in keeping down the bubbling of the electrolyte while the battery is being recharged, making it possible to recharge the battery at a higher rate, so that the battery may be fully charged in a shorter elapsed time than is ordinarily possible without injury to the battery when an ordinary conventional sulphuric acid electrolyte is used therein.

The acetic acid also cleans the battery plates of sulphate and prevents sulphation, so that the battery plates are maintained practically completely subject to the action of the electrolyte at all times, a desirable condition which prolongs the active life of the battery, so that it is more efficient and requires less frequent charging.

The uric acid, like the acetic acid, assists in keeping down the bubbling point of the battery solution while the battery is being charged, so that, as stated in connection with the acetic acid, the battery may be more quickly charged than is possible with the use of an ordinary electrolyte, without damage to the battery.

In Solution No. 2a set forth both, wherein uric crystals are used instead of uric acid, epsom salts, and bicarbonate of soda, no sacrifice of efficiency is made, since the uric crystals contain a sufficient quantity of uric acid, epsom salts, and bicarbonate of soda to perform the various offices above set forth as being performed by these elements when entered into the solution separately.

For making up the solution of my invention proceed as follows:—

Take sixty-two and one-half percent (62½%) of Solution No. 1, comprising six (6) parts of acetic acid added to ninety-four (94) parts of distilled water;

With the above mix thirty-seven and one-half percent (37½%) of Solution No. 2, comprising a mixture of one hundred fifty (150) parts of distilled water, one (1) part of uric acid, two (2) parts of epsom salts and one (1) part of bicarbonate of soda; or, instead of the immediately foregoing, thirty-seven and one-half percent (37½%) of alternative Solution No. 2a, comprising one hundred and fifty (150) parts of distilled water and one (1) part of uric crystals.

Thoroughly mix Solution No. 1 with Solution No. 2 or No. 2a so that intermixture and solution are complete.

The resultant final solution is then ready to be mixed with the ordinary lead-acid storage battery sulphuric acid electrolyte in the proportions of three and one hundred twenty-five thousandths percent (3.125%) of the above resultant final solution to ninety-six and eight hundred seventy-five thousandths percent (96.875%) of ordinary lead-acid storage battery sulphuric electrolyte.

When mixed with the electrolyte in the manner described, the solution of my invention forms approximately three and one-eighth percent (3.125%) of the prepared electrolyte.

It is within the contemplation of the present invention to substitute vegetable or fruit vinegar for acetic acid and animal urine for uric acid.

Though I have described and illustrated and explained herein a preferred embodiment of the invention, it is to be definitely understood that I do not desire to limit the application of the invention thereto, and any change or changes may be made in materials and ingredients, and in the duration and sequence of steps and operations concerned in the assembly thereof, within the spirit of the invention and the scope of the subjoined claims.

Having thus described my invention, what I claim is:

1. In a lead-acid storage battery, an electrolyte comprising a major portion of ordinary sulphuric acid storage battery electrolyte, and a minor portion of a solution containing acetic acid and uric acid.

2. In a lead-acid storage battery, an electrolyte comprising approximately ninety-six percent (96%) of ordinary sulphuric acid electrolyte, and approximately four percent (4%) of a solution containing acetic acid and uric acid, said solution comprising approximately ninety-four (94) parts of distilled water and four (4) parts of acetic acid, mixed with one hundred fifty (150) parts of distilled water and one (1) part of uric acid.

In testimony whereof I affix my signature.

JOHN C. ADEN.